Patented Sept. 15, 1953

2,652,432

UNITED STATES PATENT OFFICE 2,652,432

METHOD OF MAKING CHLOROMETHYL METHYL ETHER

William C. Bauman and Elmer L. McMaster, Midland, Mich., assignors to The Dow Chemical Company, Midland, Mich., a corporation of Delaware No Drawing. Application June 7, 1950, Serial No. 166,758

5 Claims. (Cl. 260—614)

This invention concerns an improved method of making chloromethyl methyl ether. It relates more particularly to the production of chloromethyl methyl ether by reaction of a mixture of formaldehyde and methyl alcohol with hydrogen chloride in the presence of calcium chloride.

It is known to prepare chloromethyl methyl ether by reaction of formaldehyde, methyl alcohol and hydrogen chloride. Briefly, the method consists of passing hydrogen chloride into an aqueous solution of methyl alcohol and formaldehyde until the solution is saturated with hydrogen chloride and thereafter separating the organic and the aqueous layers of the reaction mixture.

The method heretofore proposed for the production of chloromethyl methyl ether has the disadvantage that the yield of chloromethyl methyl ether is lower than is desired, particularly for production of the compound in large quantities such as are required on a commercial scale. A considerable proportion, e. g. 20 per cent by weight or more, of the chloromethyl methyl ether product remains dissolved in the aqueous phase of the reaction mixture and cannot readily be recovered in usual manner, such as by distillation or by salting out. When attempt is made to recover chloromethyl methyl ether from the aqueous phase of the reaction mixture by distillation, a large part of the chloromethyl methyl ether decomposes in the presence of the water vapor to form hydrogen chloride, formaldehyde and methyl alcohol. These compounds, particularly the formaldehyde and the methyl alcohol, frequently react together to form by-product substances, e. g. methylal, so that the overall yield of chloromethyl methyl ether is undesirably low.

It is an object of the invention to provide a method of making chloromethyl methyl ether which avoids the difficulty just mentioned. Another object is to produce chloromethyl methyl ether in good yield by reaction of methyl alcohol, hydrogen chloride and formaldehyde in an aqueous medium. Still another object is to provide a method of making chloromethyl methyl ether of high purity by procedure which prevents or substantially reduces the tendency toward the formation of undesirable by-products. A further object is to react methyl alcohol, hydrogen chloride and formaldehyde in admixture with an aqueous solution of calcium chloride to form chloromethyl methyl ether. Other and related objects will become apparent from the following description of the invention.

According to the invention, chloromethyl methyl ether can be prepared in good yield by introducing hydrogen chloride into a mixture containing, as the essential reactants, methyl alcohol and formaldehyde, the latter being preferably in the form of an aqueous solution and in the presence of, or in admixture with, calcium chloride, until the mixture is saturated or substantially saturated with respect to the hydrogen chloride and thereafter separating the chloromethyl methyl ether from the aqueous phase of the reaction mixture. By carrying out the reaction in the presence of, or in admixture with, a saturated, or a nearly saturated, aqueous solution of calcium chloride, the yield of chloromethyl methyl ether is increased over that obtained in the absence of the calcium chloride. The chloromethyl methyl ether is usually of high purity, i. e. of 95 per cent purity or higher. Such product is suitable for many purposes without further purification, e. g. the chloromethylation of aromatic compounds such as benzene or toluene. If desired, the chloromethyl methyl ether may be further purified in usual ways, e. g. by distillation.

It is important that the calcium chloride be added to the mixture of the methyl alcohol and the formaldehyde reactants, preferably to an aqueous solution of the formaldehyde and the methyl alcohol, prior to adding or introducing, the hydrogen chloride into the mixture in order to obtain good yields of the chloromethyl methyl ether.

The proportion of calcium chloride to be added to the reaction mixture is dependent for the most part upon the amount of water in admixture with the organic reactants, i. e. the methyl alcohol and the formaldehyde, employed in the reaction. The calcium chloride is usually employed in amount sufficient to form a saturated, or a nearly saturated, solution of the calcium chloride and the aqueous medium. In general, an amount of the calcium chloride corresponding to from 0.5 to 1 part by weight per part of the water in the mixture is satisfactory. When using an aqueous formaldehyde solution of from 30 to 40 per cent concentration as a starting material, the proportions of calcium chloride just stated may be based on the water in the starting mixtures, but when using anhydrous formaldehyde or paraformaldehyde as a reactant, said proportions of calcium chloride are based on the sum of the weight of water in the starting materials and the weight of water which would theoretically be formed in the reaction. There is not a great difference in the proportions of calcium chloride calculated on these two bases, but if desired said proportions of calcium chloride may in all instances be based on the amount of water calculated as present in the reacted mixture.

The formaldehyde reactant is preferably employed as an aqueous solution containing from 27 to 40 per cent by weight or more of the formaldehyde, although formaldehyde in solid form such as metaformaldehyde, paraformaldehyde, trioxymethylene, polyoxymethylene, or alpha-trioxymethylene, may be used.

The hydrogen chloride is employed in amount sufficient to saturate the mixture. It reacts with the formaldehyde and the methyl alcohol to form the chloromethyl methyl ether. The hydrogen chloride is usually added to the mixture until the mixture is saturated with respect to the hydrogen chloride. The hydrogen chloride is advantageously added to the mixture of the formaldehyde and the methyl alcohol as rapidly as the exothermic heat of reaction can be removed in any usual manner, e. g. by external cooling. For a given reactor, it has been observed that the chloromethyl methyl ether product is obtained in better yield and of higher purity when the hydrogen chloride is rapidly introduced into a mixture of the formaldehyde and the methyl alcohol until the mixture is saturated with respect thereto, than when the hydrogen chloride is added more slowly over a longer period of time.

The formaldehyde in the form of an aqueous solution, or in solid form, e. g. as paraformaldehyde, and the methyl alcohol are employed in stoichiometric or substantially stoichiometric proportions, i. e. in amounts corresponding to molecular equivalent proportions of the methyl alcohol and formaldehyde.

The reaction, which occurs readily at temperatures between 0° and 60° C., is usually carried out at temperatures of from 10° to 50° C., and at atmospheric or substantially atmospheric pressure, although the reaction may be carried out at somewhat higher pressures, e. g. at pressures of from 5 to 20 pounds per square inch, gauge.

In practice, the methyl alcohol and the formaldehyde, preferably in the form of an aqueous solution, are placed in a suitable reaction vessel, in the desired proportions, together with calcium chloride in amount sufficient to saturate the solution. The mixture is stirred and maintained at a reaction temperature between 0° C. and 60° C., preferably between 10° and 50° C., while rapidly adding hydrogen chloride to the mixture until the mixture is substantially saturated with respect to the hydrogen chloride. Thereafter, the aqueous and the organic layers of the reaction mixture are separated. The chloromethyl methyl ether, which is obtained as the organic layer, is usually of 95 per cent purity or higher. If desired, it may be further purified in usual ways, e. g. by distillation.

The following examples illustrate ways in which the principle of the invention has been applied, but are not to be construed as limiting the invention.

*Example 1*

A solution consisting of 96 grams (3 moles) of methyl alcohol and 250 grams of an aqueous solution containing 36 per cent by weight of formaldehyde, was placed in a glass reaction flask equipped with a gas inlet, a reflux condenser and a stirrer. The solution was stirred and 207 grams of solid calcium chloride containing about 20 per cent by weight of water of crystallization, was added thereto. The mixture was maintained at temperatures between 40° and 50° C. while rapidly introducing a stream of hydrogen chloride over a period of 30 minutes. A total of 168 grams (4.7 moles) of hydrogen chloride was absorbed in the mixture. The mixture was removed from the flask and the organic and the aqueous layers were separated. There was obtained 207.5 grams of organic liquid having a specific gravity of 1.065 at a temperature of 24° C. The product was substantially pure chloromethyl methyl ether. The yield was 86 per cent of theory.

The experiment was repeated by introducing 166 grams of hydrogen chloride into a mixture consisting of 96 grams of methyl alcohol and 250 grams of an aqueous 36 weight per cent formaldehyde solution, under similar time and temperature conditions, except in the absence of calcium chloride. The aqueous and the organic layers of the reaction mixture were separated. There was obtained 122 grams of organic liquid. The aqueous layer was saturated with calcium chloride and 32 grams of organic liquid recovered therefrom. The combined organic product had a specific gravity of 1.075 at 25° C. The yield of chloromethyl methyl ether was only 63.8 per cent of theory.

*Example 2*

A mixture consisting of 96 grams (3 moles) of methyl alcohol, 90 grams of polyoxymethylene and 40 grams of granular calcium chloride containing about 20 per cent by weight of water of crystallization, was placed in a reaction flask equipped with a gas inlet, a reflux condenser and a stirrer. The mixture was stirred and heated to a temperature of 40° C. Thereafter, a stream of hydrogen chloride was introduced into the mixture over a period of one hour. Approximately 127 grams of hydrogen chloride were absorbed in the mixture. The reaction mixture consisted of an organic layer and an aqueous layer. It was cooled and the organic layer separated. There was obtained 206 grams of liquid product having a specific gravity of 1.072 at 25° C. The product was substantially pure chloromethyl methyl ether. The yield was 85.3 per cent of theory.

*Example 3*

A solution consisting of 96 grams (3 moles) of methyl alcohol and 250 grams of an aqueous solution containing 36 per cent by weight of formaldehyde, was placed in a reaction vessel equipped with a gas inlet, a reflux condenser and a stirrer. The solution was stirred and 150 grams of granular calcium chloride containing 20 per cent by weight of water of crystallization, was added thereto. The mixture was cooled to 10° C. A stream of hydrogen chloride was rapidly added to the mixture over a period of 30 minutes while maintaining the temperature of the mixture at 10° C. Approximately 273 grams of hydrogen chloride was absorbed in the mixture. Thereafter, the aqueous and the organic layers of the reaction mixture were separated. There was obtained 210 grams of organic liquid having a specific gravity of 1.079 at 25° C. It was chloromethyl methyl ether which was nearly pure except for containing dissolved hydrogen chloride. It had a boiling range of 95 per cent at 55°–59° C. and a specific gravity of 1.070 at 25° C. The yield was 87 per cent of theory.

For purpose of comparison, the experiment was repeated by introducing 288 grams of hydrogen chloride into a mixture consisting of 96 grams of methyl alcohol and 250 grams of an aqueous 36 weight per cent formaldehyde solution under similar conditions of time and temperature, except in the absence of calcium chloride. Thereafter, the organic and the aqueous layers of the reaction mixture were separated. There was obtained 160 grams of organic liquid having a specific gravity of 1.070 at 25° C. The aqueous layer was then saturated with calcium chloride. No organic liquid separated. The yield of chloromethyl methyl ether was only 66.3 per cent of theory.

Other modes of applying the principle of the invention may be employed instead of those explained, change being made as regards the step or compounds herein employed, provided the steps or compounds stated in any of the following claims, or the equivalent of such compounds or steps be employed.

We claim:

1. A method of making chloromethyl methyl ether which comprises, introducing hydrogen chloride into a mixture containing, as the essential reactants, approximately molecular equivalent proportions of formaldehyde and methyl alcohol in admixture with calcium chloride in amount corresponding to from 0.5 to 1 part by weight of the calcium chloride per part of water to be present upon completion of the reaction, at a temperature between 0° and 60° C. until the mixture is substantially saturated with respect to the hydrogen chloride and thereafter separating chloromethyl methyl ether from the reaction mixture.

2. A method of making chloromethyl methyl ether which comprises, introducing hydrogen chloride into a mixture containing, as the essential reactants, approximately molecular equivalent proportions of formaldehyde and methyl alcohol in admixture with a nearly saturated aqueous solution of calcium chloride, at a temperature between 0° and 60° C., until the mixture is substantially saturated with respect to the hydrogen chloride and thereafter separating chloromethyl methyl ether from the reaction mixture.

3. A method of making chloromethyl methyl ether which comprises, introducing hydrogen chloride into a mixture consisting of approximately molecular equivalent proportions of methyl alcohol and formaldehyde in admixture with a nearly saturated aqueous solution of calcium chloride, at a temperature between 0° and 60° C., until the mixture is substantially saturated with respect to the hydrogen chloride and thereafter separating the aqueous and the organic layers of the reaction mixture.

4. In a method of making chloromethyl methyl ether by introducing hydrogen chloride into a mixture consisting of methyl alcohol and an aqueous solution of formaldehyde, the improvement which consists in adding to the aqueous mixture calcium chloride in amount corresponding to from 0.5 to 1 part by weight of the calcium chloride per part of water to be present upon completion of the reaction, introducing hydrogen chloride into the mixture at a temperature between 0° and 60° C. until the mixture is substantially saturated with respect to the hydrogen chloride and thereafter separating the aqueous and the organic layers of the reaction mixture.

5. In a method of making chloromethyl methyl ether by reaction of hydrogen chloride with a mixture of methyl alcohol and formaldehyde, the steps of adding to a mixture consisting of molecular equivalent proportions of methyl alcohol and formaldehyde, the latter being in the form of an aqueous solution containing from 27 to 40 per cent by weight of the formaldehyde, calcium chloride in amount corresponding to from 0.5 to 1 part by weight of the calcium chloride per part of water to be present upon completion of the reaction, introducing hydrogen chloride into the mixture at a temperature between 0° and 60° C. until the mixture is substantially saturated with respect to the hydrogen chloride and thereafter separating chloromethyl methyl ether from the reaction mixture.

WILLIAM C. BAUMAN.
ELMER L. McMASTER.

References Cited in the file of this patent

UNITED STATES PATENTS

| Number | Name | Date |
|---|---|---|
| 1,660,756 | Lichtenthaeler | Feb. 28, 1928 |
| 1,695,449 | Bannister | Dec. 18, 1928 |
| 2,304,431 | Walker | Dec. 18, 1942 |
| 2,370,540 | Hodge | Feb. 27, 1945 |
| 2,532,044 | Walker et al. | Nov. 28, 1950 |

OTHER REFERENCES

Cumming et al., "Systematic Organic Chemistry," page 215, D. Van Nostrand Co., New York (1925).

Walker, "Formaldehyde," pages 144–145, Reinhold Publishing Co., New York (1944).